US012664617B2

(12) United States Patent
Song et al.

(10) Patent No.: US 12,664,617 B2
(45) Date of Patent: Jun. 23, 2026

(54) ELECTRONIC DEVICE AND METHOD FOR GENERATING IMAGE WITH ENHANCED DEPTH PERCEIVED BY VIEWER

(71) Applicant: SAMSUNG ELECTRONICS CO., LTD., Suwon-si (KR)

(72) Inventors: Youngchan Song, Suwon-si (KR); Hanul Shin, Suwon-si (KR); Soomin Kang, Suwon-si (KR); Tammy Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 471 days.

(21) Appl. No.: 18/200,361

(22) Filed: May 22, 2023

(65) Prior Publication Data

US 2024/0070814 A1     Feb. 29, 2024

Related U.S. Application Data

(63) Continuation of application No. PCT/KR2023/006342, filed on May 10, 2023.

(30) Foreign Application Priority Data

Aug. 23, 2022    (KR) ........................ 10-2022-0105808
Nov. 14, 2022    (KR) ........................ 10-2022-0151991

(51) Int. Cl.
*G06T 5/60*          (2024.01)
*G06N 3/045*         (2023.01)
(52) U.S. Cl.
CPC .............. *G06T 5/60* (2024.01); *G06N 3/045* (2023.01); *G06T 2207/20084* (2013.01); *G06T 2207/20092* (2013.01)

(58) Field of Classification Search
CPC .... G06T 5/00; G06T 5/60; G06T 5/70; G06T 5/73; G06T 2207/20081;
(Continued)

(56) References Cited

U.S. PATENT DOCUMENTS 8,605,105 B2    12/2013  Hong et al.
10,255,686 B2    4/2019  Bhardwaj et al.
(Continued)

FOREIGN PATENT DOCUMENTS

EP        2 608 549 B1     9/2017
KR    10-2011-0052207 A    5/2011
(Continued)

OTHER PUBLICATIONS

Qian, Ming, et al. "Bggan: Bokeh-glass generative adversarial network for rendering realistic bokeh." European Conference on Computer Vision. Cham: Springer International Publishing, 2020. (Year: 2020).*
(Continued)

*Primary Examiner* — Geoffrey E Summers
(74) *Attorney, Agent, or Firm* — Sughrue Mion, PLLC

(57)          ABSTRACT

An electronic device for generating an image with an enhanced depth as perceived by a viewer includes at least one memory storing instructions, and at least one processor configured to execute the instructions to receive an input image, receive a control parameter for adjusting a first level of at least one pictorial depth cue included in the input image, and generate an output image including the at least one pictorial depth cue at a second level that is adjusted from the first level based on the control parameter using a deep neural network.

20 Claims, 15 Drawing Sheets

(58) Field of Classification Search
   CPC .......... G06T 2207/20084; G06T 2207/20092;
                                           G06N 3/02–0985
   See application file for complete search history.

(56)                    References Cited

U.S. PATENT DOCUMENTS

| | | | |
|---|---|---|---|
| 10,878,819 | B1 | 12/2020 | Chavez et al. |
| 11,004,223 | B2 | 5/2021 | Jakubiak et al. |
| 11,145,028 | B2 | 10/2021 | Ye et al. |
| 2015/0116458 | A1 | 4/2015 | Barkatullah |
| 2017/0178298 | A1* | 6/2017 | Bonnier ............... H04N 13/122 |
| 2020/0134383 | A1 | 4/2020 | Rhee et al. |
| 2021/0073953 | A1 | 3/2021 | Lee |
| 2021/0150747 | A1 | 5/2021 | Liu et al. |
| 2021/0183089 | A1 | 6/2021 | Wadhwa et al. |
| 2022/0067950 | A1 | 3/2022 | Lv et al. |

FOREIGN PATENT DOCUMENTS

| | | |
|---|---|---|
| KR | 10-1636537 B1 | 7/2016 |
| KR | 10-2020-0020646 A | 2/2020 |
| KR | 10-2020-0048032 A | 5/2020 |
| KR | 10-2021-0058683 A | 5/2021 |
| KR | 10-2022-0029335 A | 3/2022 |

OTHER PUBLICATIONS

Kang, Seokjun, Seiichi Uchida, and Brian Kenji Iwana. "Tunable U-Net: Controlling image-to-image outputs using a tunable scalar value." IEEE Access 9 (2021): 103279-103290. (Year: 2021).*

Mather, George. "The use of image blur as a depth cue." Perception 26.9 (1997): 1147-1158. (Year: 1997).*

Van Dijk, Tom, and Guido De Croon. "How Do Neural Networks See Depth in Single Images?." 2019 IEEE/CVF International Conference on Computer Vision (ICCV). IEEE, 2019. (Year: 2019).*

Extended European Search Report dated Jul. 9, 2025, issued by the European Patent Office in European Application No. 23857475.0.

Dutta et al., "Stacked Deep Multi-Scale Hierarchical Network for Fast Bokeh Effect Rendering from a Single Image", IEEE, 2021, XP033967265, 2398-2407 (10 pages total).

Barsky et al., "Algorithms for Rendering Depth of Field Effects in Computer Graphics", 2008 (12 pages total).

Communication dated Aug. 16, 2023, issued by the International Searching Authority in counterpart International Application No. PCT/KR2023/006342 (PCT/ISA/220, PCT/ISA/210, and PCT/ISA/237).

Lee et al., "An image-guided network for depth edge enhancement," EURASIP Journal on Image and Video Processing, 2022:6. 2022, Total 14 pages, https://doi.org/10.1186/s13640-022-00583-9.

He et al., "Learning Depth from Single Images with Deep Neural Network Embedding Focal Length," arXiv:1803.10039v1 [cs.CV], Mar. 2018, Total 14 pages.

Wadhwa et al., "Synthetic Depth-of-Field with a Single-Camera Mobile Phone," ACM Trans. Graph., vol. 37, No. 4, Article 64, 2018, Total 18 pages.

Mahmoudpour et al., "Comparison of Objective Metrics and 3D Evaluation Using Map," JBE vol. 20, No. 2, pp. 204-214, Mar. 2015.

Communication issued Dec. 3, 2025 by the European Patent Office in European Patent Application No. 23857475.0.

* cited by examiner

⊗ : ELEMENT-WISE MULTIPLICATION

FIG. 12

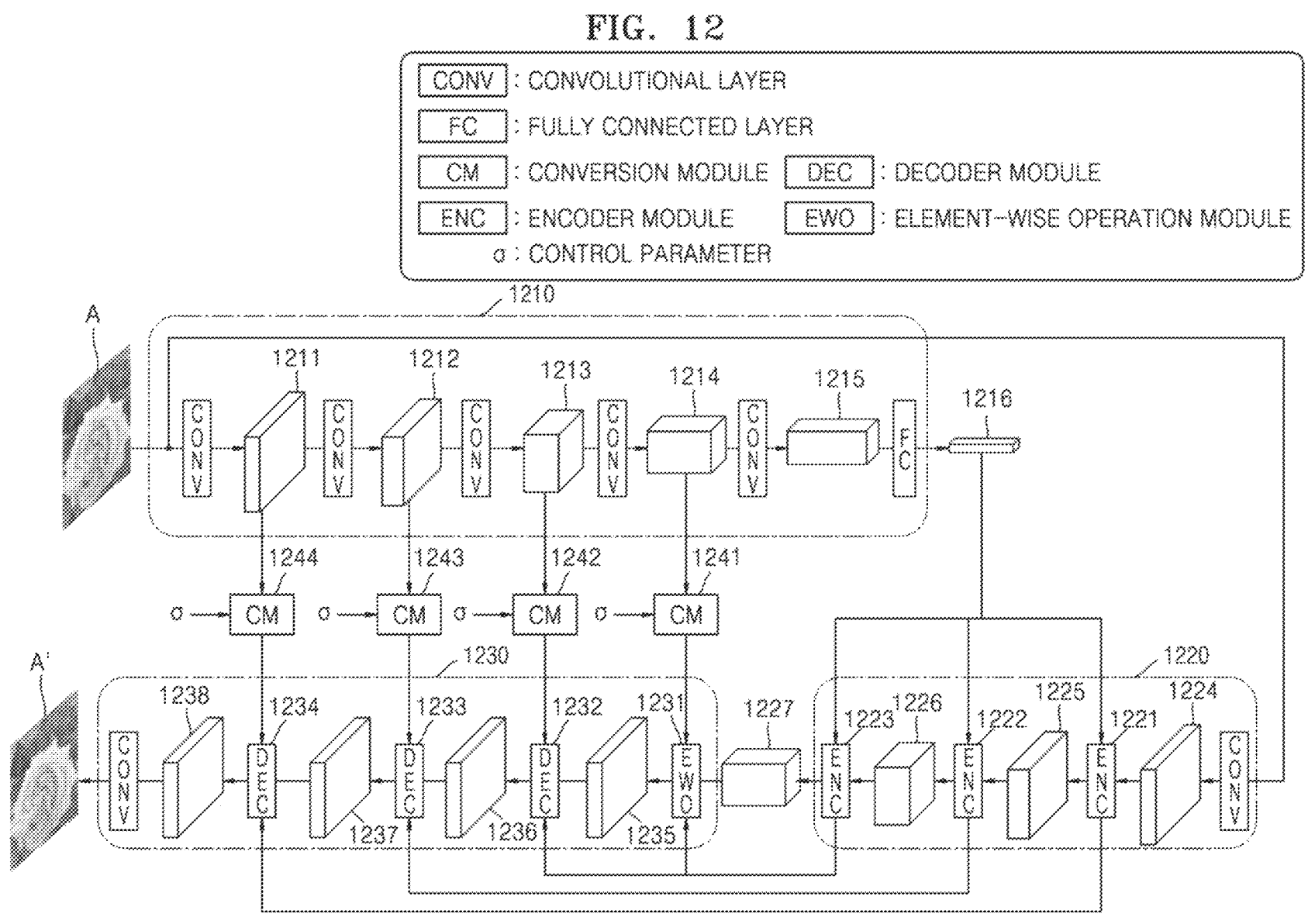

| CONV | : CONVOLUTIONAL LAYER |
| FC | : FULLY CONNECTED LAYER |
| CM | : CONVERSION MODULE |
| ENC | : ENCODER MODULE |

| DEC | : DECODER MODULE |
| EWO | : ELEMENT-WISE OPERATION MODULE |
| σ | : CONTROL PARAMETER |

$\sigma = 0.0$          $\sigma = 0.25$          $\sigma = 0.5$          $\sigma = 0.75$          $\sigma = 1.0$

ELECTRONIC DEVICE AND METHOD FOR GENERATING IMAGE WITH ENHANCED DEPTH PERCEIVED BY VIEWER

CROSS-REFERENCE TO RELATED APPLICATIONS

This application is based on and claims priority to International Application No. PCT/KR2023/006342, filed on May 10, 2023, in the Korean Intellectual Property Receiving Office, which is based on and claims priority to Korean Patent Application No. 10-2022-0151991, filed on Nov. 14, 2022 in the Korean Intellectual Property Office, and Korean Patent Application No. 10-2022-0105808, filed on Aug. 23, 2022, in the Korean Intellectual Property Office, the disclosures of which are incorporated herein by reference in their entireties.

BACKGROUND

1. Field

The disclosure relates to an electronic device and method for generating an image with an enhanced depth as perceived by a viewer.

2. Description of Related Art

Depth perception may refer to a visual ability to perceive depth. Depth perception may occur due to various depth cues. Types of depth cues include monocular cues and binocular cues. Monocular cues are cues that enable perception of a depth using only one eye. Examples of the monocular cues include occlusion, a relative size, and light and shadow. Binocular cues are cues that allow both eyes to act together to perceive a depth. Examples of the binocular cues include convergence and binocular disparity. Pictorial depth cues may refer to information enabling recognition of a depth in a two-dimensional (2D) image. All pieces of information by which a viewer can perceive depth in a 2D image may be pictorial depth cues.

In order to generate an image with an enhanced depth as perceived by a viewer, related art methods using depth maps of an image are used. A depth map generated from a single image has low accuracy, and incorrect depth information may be provided to a viewer due to a low accuracy depth map.

SUMMARY

Additional aspects will be set forth in part in the description which follows and, in part, will be apparent from the description, or may be learned by practice of the presented embodiments.

According to an aspect of the disclosure, an electronic device for generating an image with an enhanced depth as perceived by a viewer may include at least one memory storing instructions, and at least one processor configured to execute the instructions to receive an input image, receive a control parameter for adjusting a first level of at least one pictorial depth cue included in the input image, and generate an output image including the at least one pictorial depth cue at a second level that is adjusted from the first level based on the control parameter using a deep neural network, where the deep neural network may include a first neural network configured to receive the input image and output a feature vector corresponding to the input image, a second neural network configured to receive the input image, and generate a feature map by reducing a spatial resolution of the input image, a third neural network configured to receive the feature map output by the second neural network, and generate the output image by increasing a spatial resolution of the feature map output by the second neural network, and at least one controllable conversion module configured to receive a feature map of a hidden layer of the first neural network, and convert the feature map of the hidden layer of the first neural network, based on the control parameter, where the second neural network is further configured to combine a feature map of a hidden layer of the second neural network with the feature vector output by the first neural network, and the third neural network is further configured to combine a feature map of a hidden layer of the third neural network with the converted feature map of the hidden layer of the first neural network.

The at least one controllable conversion module may be further configured to generate a first feature map from the feature map of the hidden layer of the first neural network, generate a first weight vector and a second weight vector based on the control parameter, generate a second feature map based on element-wise multiplication of the first feature map and the first weight vector, generate a third feature map based on element-wise multiplication of the first feature map and the second weight vector, and generate the converted feature map of the hidden layer of the first neural network by concatenating the second feature map and the third feature map.

A norm of the first feature map may be the same as with a norm of the converted feature map of the hidden layer of the first neural network.

A sum of squares of a norm of the first weight vector and a norm of the second weight vector may be constant.

The second neural network may include a sequence of a plurality of encoder modules configured to reduce the spatial resolution of the input image and at least one encoder module among the plurality of encoder modules may be configured to generate an output feature map from an input feature map based on downsampling.

The at least one encoder module among the plurality of encoder modules may be configured to receive a feature map of a previous encoder module in the sequence of the plurality of encoder modules as the input feature map, generate an intermediate feature map of the at least one encoder module based on the input feature map through at least one layer, generate a combined feature map of the at least one encoder module by combining the intermediate feature map with the feature vector received from the first neural network, and generate the output feature map of the at least one encoder module by downsampling the combined feature map.

The at least one encoder module among the plurality of encoder modules may be further configured to convert a size of the feature vector received from the first neural network based on a number of channels of the intermediate feature map and generate the combined feature map based on element-wise multiplication of the intermediate feature map with the size-converted feature vector output by the first neural network.

The third neural network may include a sequence of a plurality of decoder modules configured to generate the output image by increasing the spatial resolution of the feature map output by the second neural network and at least one decoder module among the plurality of decoder modules may be configured to generate an output feature map from an input feature map, based on upsampling.

The at least one decoder module among the plurality of decoder modules may be configured to receive an output feature map of a previous decoder module in the sequence of the plurality of decoder modules, as the input feature map of the at least one decoder module, upsample the input feature map, generate an intermediate feature map of the at least one decoder module based on the upsampled input feature map through at least one layer, receive the converted feature map of the hidden layer of the first neural network from the at least one controllable conversion module, generate a combined feature map of the at least one decoder module by combining the intermediate feature map of with the converted feature map of the hidden layer of the first neural network, and generate the output feature map of the at least one decoder module based on the combined feature map through at least one layer.

The at least one decoder module among the plurality of decoder modules may be configured to generate the intermediate feature map by concatenating the upsampled input feature map of the at least one decoder module and a feature map of at least one encoder module.

The at least one decoder module among the plurality of decoder modules may be further configured to convert a size of the converted feature map of the hidden layer of the first neural network to be equal to a size of the intermediate feature map and generate the combined feature map based on an element-wise operation on the intermediate feature map and the size-converted feature map of the hidden layer of the first neural network.

The at least one controllable conversion module may include a first controllable conversion module and a second controllable conversion module, where the first controllable conversion module is configured to receive and convert a feature map of a first hidden layer of the first neural network, where the second controllable conversion module is configured to receive and convert a feature map of a second hidden layer of the first neural network, where the sequence of the plurality of decoder modules includes a first decoder module and a second decoder module, where the first decoder module is configured to receive the converted feature map of the first hidden layer of the first neural network from the first controllable conversion module, and where the second decoder module is configured to receive the converted feature map of the second hidden layer of the first neural network from the second controllable conversion module.

The first decoder module may precede the second decoder module in the sequence of the plurality of decoder modules, and the second hidden layer may precede the first hidden layer.

The hidden layer of the first neural network may be a convolutional layer.

Output images having pictorial depth cues of different levels may be output for control parameters having different values.

The second level of a pictorial depth cue of the output image may periodically change as a value of the control parameter is increased.

The at least one pictorial depth cue may include a first pictorial depth cue and a second pictorial depth cue, where the control parameter is a single variable, and where a level of the first pictorial depth cue and a level of the second pictorial depth cue of the output image are changed as a value of the control parameter is changed.

In a first feature vector output by the first neural network receiving a first input image, a second feature vector output by the first neural network receiving a second input image identical to the first input image, and a third feature vector output by the first neural network receiving a third input image which is obtained by adding a pictorial depth cue to the first input image, a magnitude of a difference between the first feature vector and the second feature vector may be less than a magnitude of a difference between the first feature vector and the third feature vector.

The at least one pictorial depth cue may include at least one of blur, contrast, and sharpness.

According to an aspect of the disclosure, a method of generating an image with an enhanced depth as perceived by a viewer may include receiving an input image, receiving a control parameter for adjusting a first level of at least one pictorial depth cue included in the input image, and generating an output image including the at least one pictorial depth cue of a second level that is adjusted from the first level based on the control parameter a deep neural network, where the deep neural network may include a first neural network configured to receive the input image and output a feature vector corresponding to the input image, a second neural network configured to receive the input image, and generate a feature map by reducing a spatial resolution of the input image, a third neural network configured to receive the feature map output by the second neural network, and generate the output image by increasing a spatial resolution of the feature map output by the second neural network, and at least one controllable conversion module configured to receive a feature map of a hidden layer of the first neural network, and convert the feature map of the hidden layer of the first neural network, based on the control parameter, where the second neural network is further configured to combine a feature map of a hidden layer of the second neural network with the feature vector output by the first neural network, and the third neural network is further configured to combine a feature map of a hidden layer of the third neural network with the converted feature map of the hidden layer of the first neural network.

According to an aspect of the disclosure, a non-transitory computer-readable storage medium may store instructions that, when executed by at least one processor, cause the at least one processor to, receive an input image, receive a control parameter for adjusting a first level of at least one pictorial depth cue included in the input image, and generate, using a deep neural network, an output image including the at least one pictorial depth cue at a second level that is adjusted from the first level based on the control parameter, where the deep neural network may include a first neural network configured to output a feature vector corresponding to the input image and a feature map of a hidden layer of the first neural network, a second neural network configured to generate a feature map by reducing a spatial resolution of the input image, and a third neural network configured to generate the output image by increasing a spatial resolution of the feature map generated by the second neural network.

BRIEF DESCRIPTION OF DRAWINGS

The above and other aspects, features, and advantages of certain embodiments of the present disclosure will be more apparent from the following description taken in conjunction with the accompanying drawings, in which:

FIG. 12 is a diagram illustrating a flow of feature maps from an input image to an output image, according to an embodiment of the disclosure;

DETAILED DESCRIPTION

Figure 1:
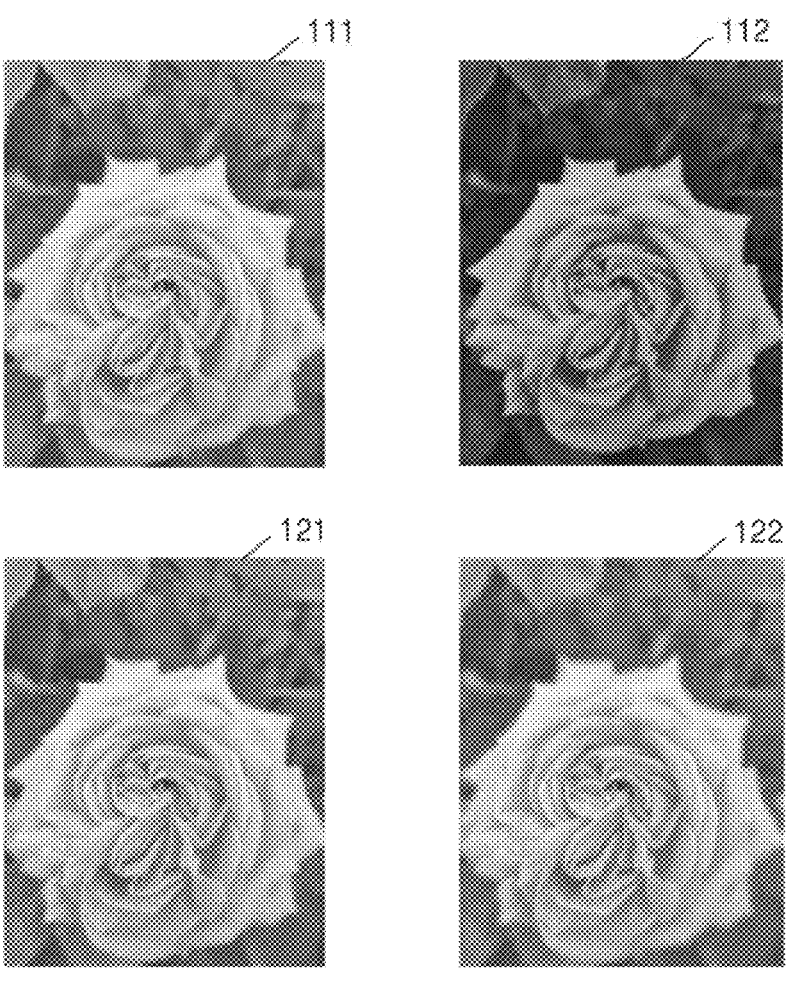
FIG. 1 is a diagram of an image with an enhanced depth as perceived by a viewer, according to an embodiment of the disclosure.

Hereinafter, example embodiments of the disclosure will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms. It is to be understood that singular forms include plural referents unless the context clearly dictates otherwise.

Throughout the disclosure, the expression "at least one of a, b or c" indicates only a, only b, only c, both a and b, both a and c, both b and c, all of a, b, and c, or variations thereof.

Although general terms widely used at present were selected for describing the present disclosure in consideration of the functions thereof, these general terms may vary according to intentions of one of ordinary skill in the art, case precedents, the advent of new technologies, or the like. Terms arbitrarily selected by the applicant of the disclosure may also be used in a specific case. In this case, their meanings need to be given in the detailed description of the disclosure. Hence, the terms must be defined based on their meanings and the contents of the entire specification, not by simply stating the terms.

The terms "comprises" and/or "comprising" or "includes" and/or "including" when used in this specification, specify the presence of stated elements, but do not preclude the presence or addition of one or more other elements. The terms "module" and the like when used in this specification refer to a unit in which at least one function or operation is performed, and may be implemented as hardware, software, or a combination of hardware and software.

As used herein, the singular forms "a", "an", and "the" are intended to include the plural forms as well, unless the context clearly indicates otherwise. Likewise, the plural forms encompass the expression of the singular, unless it has a clearly different meaning in the context.

Functions related to artificial intelligence (AI) according to the disclosure are operated through a processor and a memory. The processor may include one or a plurality of processors. The one or plurality of processors may be a general-purpose processor such as a central processing unit (CPU), an application processor (AP), or a digital signal processor (DSP), a graphics-only processor such as a graphics processing unit (GPU) or a vision processing unit (VPU), or an AI-only processor such as a neural processing unit (NPU). The one or plurality of processors may process input data, according to a predefined operation rule or AI model stored in the memory. Alternatively, when the one or plurality of processors are AI-only processors, the AI-only processors may be designed in a hardware structure specialized for processing a specific AI model.

The predefined operation rule or AI model is characterized in that it is created through learning. Being created through learning may indicate that a basic AI model is trained using a plurality of learning data by a learning algorithm, such that a predefined operation rule or AI model set to perform desired characteristics (or a desired purpose) is created. Such learning may be performed in a device itself on which AI according to the disclosure is performed, or may be performed through a separate server and/or system. Examples of the learning algorithm include, but are not limited to, supervised learning, unsupervised learning, semi-supervised learning, or reinforcement learning.

The AI model may include a plurality of neural network layers. Each of the plurality of neural network layers has a plurality of weight values, and performs a neural network operation through an operation between an operation result of a previous layer and the plurality of weight values. The plurality of weight values of the plurality of neural network layers may be optimized by a learning result of the AI model. For example, the plurality of weight values may be updated such that a loss value or a cost value obtained from the AI model is reduced or minimized during a learning process. An artificial neural network may include a deep neural network (DNN), for example, a Convolutional Neural Network (CNN), a Deep Neural Network (DNN), a Recurrent Neural Network (RNN), a Restricted Boltzmann Machine (RBM), a Deep Belief Network (DBN), a Bidirectional Recurrent Deep Neural Network (BRDNN), or a Deep Q-Networks, but embodiments of the disclosure are not limited thereto.

FIG. 1 is a diagram of an image with an enhanced depth as perceived by a viewer, according to an embodiment of the disclosure.

Pictorial depth cues may be defined as any information of two-dimensional (2D) visual representations from which a viewer is able to infer a three-dimensional (3D) spatial relationship. Pictorial depth cues may include blur, contrast, or sharpness, for example. Pictorial depth cues may also include, for example, a linear perspective, an aerial perspective, a texture gradient, a familiar size, or light and shadow. In addition, information of various 2D visual expressions may be pictorial depth cues.

As information of a 2D visual expression enabling a 3D spatial relationship to be inferred is provided to a viewer, the viewer may recognize a depth in an image. When an image including a higher level of information about a 2D visual expression enabling a 3D spatial relationship to be inferred is provided to a viewer, a depth as perceived by the viewer from the image may be enhanced. In other words, when an image including a higher-level pictorial depth cue is provided to a viewer, a depth as perceived by the viewer from the image may be enhanced.

For example, a higher level of pictorial depth cues may be implemented by a higher level of blur, a higher level of contrast, or a higher level of sharpness. In the case of Gaussian blur, a higher level of blur may be realized by increasing a standard deviation. Alternatively, a higher level of blur may be realized by increasing a blur metric. The blur metric is the level of blur calculated by detecting an edge in a depth map and measuring a width between the start and end of the edge. A higher level of blur may be realized by increasing a contrast ratio. A higher level of sharpness may be realized by increasing a sharpness degree. The sharpness degree may be calculated using Equation (1):

$$SD = \frac{1}{LM} \sum_{y=1}^{L} \sum_{x=1}^{M} \left[ (P(x, y) - P(x-1, y))^2 + (P(x, y) - P(x, y-1))^2 \right] \quad (1)$$

where SD indicates a sharpness degree, and P(x,y) indicates a pixel value in (x,y).

Upper images 111 and 112 of FIG. 1 are images each including a contrast as a pictorial depth cue. The upper image 112 on the right side includes a higher level of pictorial depth cues than the upper image 111 on the left side. In other words, the upper image 112 on the right side has a higher contrast than the upper image 111 on the left side. As the upper image 112 on the right side includes a higher level of pictorial depth cues than the upper image 111 on the left side, a viewer may perceive a depth more clearly in the upper image 112 on the right side than in the upper image 111 on the left side.

Lower images 121 and 122 of FIG. 1 are images each including a blur as a pictorial depth cue. The lower image 122 on the right side includes a higher level of pictorial depth cues than the lower image 121 on the left side. In other words, the lower image 122 on the right side has a blurrier background portion than the lower image 121 on the left side. As the lower image 122 on the right side includes a higher level of pictorial depth cues than the lower image 121 on the left side, a viewer may perceive a depth more clearly in the lower image 122 on the right side than in the lower image 121 on the left side.

Figure 2:
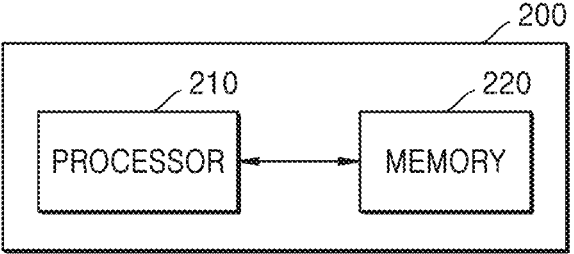
FIG. 2 is a block diagram of an electronic device for generating an image with an enhanced depth as perceived by a viewer, according to an embodiment of the disclosure.

FIG. 2 is a diagram of an electronic device 200 for generating an image with an enhanced depth as perceived by a viewer, according to an embodiment of the disclosure.

The electronic device 200 according to an embodiment of the disclosure includes at least one processor 210 and at least one memory 220.

The electronic device 200 may be configured to generate an image with an enhanced depth as perceived by the viewer. The memory 220 may be configured to store one or more instructions for generating an image with an enhanced depth as perceived by the viewer, and the processor 210 may be configured to execute the one or more instructions to generate the image with an enhanced depth as perceived by the viewer.

According to an embodiment of the disclosure, the processor 210 may be configured to receive an input image, receive a control parameter for adjusting a first level of at least one pictorial depth cue included in the input image, and generate an output image including at least one pictorial depth cue at a second level that is adjusted from the first level based on the control parameter using a deep neural network.

According to an embodiment of the disclosure, the processor 210 may be configured to receive the input image and generate an output image including a picture depth cue adjusted from the input image using a deep neural network.

As the processor 210 is configured to adjust the level of the pictorial depth cue included in the input image using the deep neural network, the processor 210 may not use a depth map to generate the output image. Accordingly, incorrect depth information may be prevented from being added to the output image due to an error occurring in a process of processing the depth map. Because the level of the pictorial depth cue included in the input image may be adjusted by the control parameter, an output image having a pictorial depth cue of a desired level may be provided to the viewer.

The input image or the control parameter may be fetched from memory 220 or may be input by a user. The electronic device 200 may further include a user interface for receiving the input image or the control parameter from the user.

Hereinafter, embodiments of a method of generating an image with an enhanced depth as recognized by a viewer will now be described with reference to the electronic device 200, the processor 210, and the memory 220 shown in FIG. 2.

Figure 3:
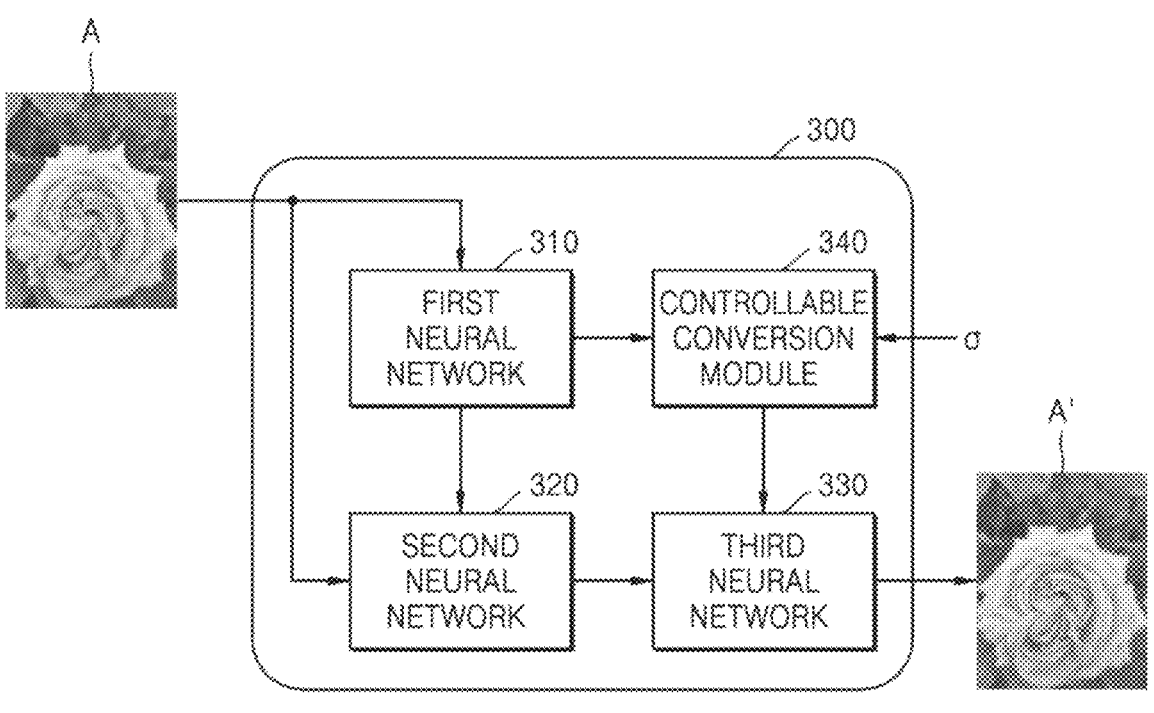
FIG. 3 is a diagram of a deep neural network according to an embodiment of the disclosure.

FIG. 3 is a diagram of a deep neural network 300 according to an embodiment of the disclosure.

The processor 210 may generate an output image A' including at least one pictorial depth cue at a level adjusted based on a control parameter a from an input image A using the deep neural network 300. For example, the processor 210 may generate an output image A' of which the level of blur has been adjusted. For example, the processor 210 may generate an output image A' of which the level of sharpness, the level of contrast, and the level of blur have been adjusted.

The deep neural network 300 may include a first neural network 310, a second neural network 320, a third neural network 330, and at least one controllable conversion module 340.

The first neural network 310 may receive the input image A and output a feature vector for the input image A. In other words, an input of the first neural network 310 may be the input image A, and an output of the first neural network 310 may be a feature vector for the input image A.

The first neural network 310 may be a CNN. The first neural network 310 may include convolutional layers, pooling layers, and fully connected layers.

The first neural network 310 may be based on the models of a CNN. For example, the first neural network 310 may be a convolutional neural network based on a Visual Geometry Group (VGG), GoogLeNet, Parametric rectified linear unit (ReLU)-Net (PReLU-Net), or Residual Neural Network (ResNet).

The second neural network 320 may receive the input image A, and may output a feature map by reducing a spatial resolution of the input image A. In other words, an input of the second neural network 320 may be the input image A, and an output of the second neural network 320 may be a feature map for the input image A.

The second neural network 320 may receive the feature vector output by the first neural network 310. A feature map of at least one of the hidden layers of the second neural network 320 may be combined with the feature vector received from the first neural network 310.

The controllable conversion module 340 may receive a feature map of a hidden layer of the first neural network 310 and a control parameter a. The controllable conversion module 340 may convert and output the feature map received from the first neural network 310, based on the control parameter a. In other words, an input of the controllable conversion module 340 may be the feature map of the hidden layer of the first neural network 310, and an output of the controllable conversion module 340 may be a converted feature map of the hidden layer of the first neural network 310.

The third neural network 330 may receive the feature map from the second neural network 320, and may output an output image A' by increasing the spatial resolution of the feature map output by the second neural network 320. In other words, an input of the third neural network 330 may be the output of the second neural network 320, and an output of the third neural network 330 may be the output image A'.

The third neural network 330 may receive the feature map of the hidden layer of the first neural network corresponding to a result of the conversion from the controllable conversion module 340. A feature map of at least one of the hidden layers of the third neural network 330 may be combined with the feature map received by the third neural network 330 from the second neural network 320.

Figure 4:
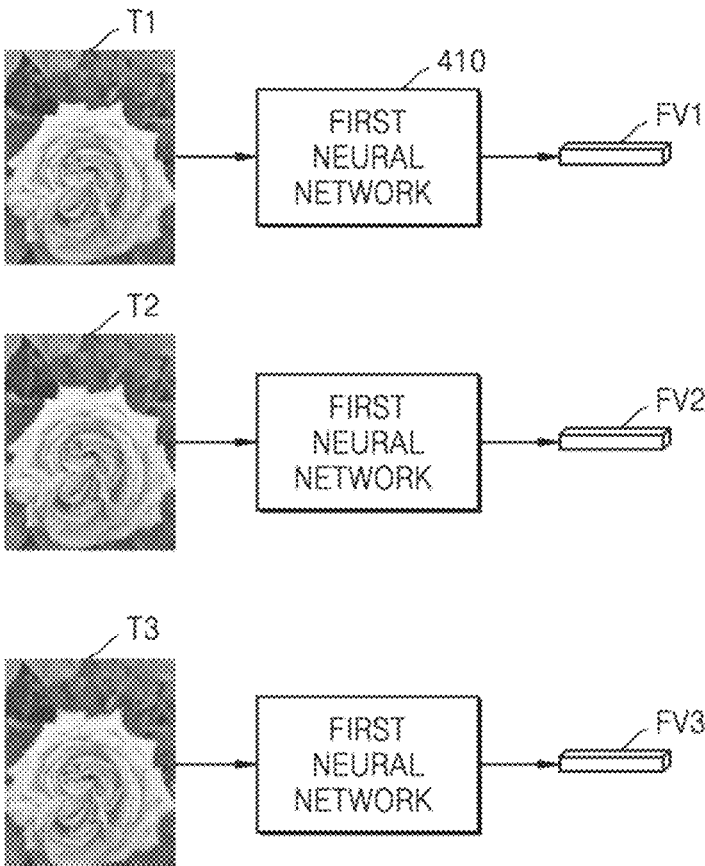
FIG. 4 is a diagram illustrating training of a first neural network according to an embodiment of the disclosure.

FIG. 4 is a diagram illustrating training of a first neural network 410 according to an embodiment of the disclosure.

Unsupervised learning may be used to train the first neural network 410. The first neural network 410 may be trained to separate training images including pictorial depth cues of the same (or relatively similar) levels from training images including pictorial depth cues of different (or relatively dissimilar) levels.

According to an embodiment of the disclosure, a first training image T1, a second training image T2, and a third training image T3 may be used to train the first neural network 410.

The second training image T2 may be the same as the first training image T1, and the third training image T3 may be an image obtained by adding a pictorial depth cue to the first training image T1. In this case, the first neural network 410 may be trained such that a magnitude of a difference between a first feature vector FV1 of the first training image T1 and a second feature vector FV2 of the second training image T2 is less than a magnitude of a difference between the first feature vector FV1 of the first training image T1 and a third feature vector FV3 of the third training image T3.

The second training image T2 may be an image having a relatively small level difference of a pictorial depth cue from the first training image T1, and the third training image T3 may be an image having a relatively large level difference of a pictorial depth cue from the first training image T1. In this case, the first neural network 410 may be trained such that the magnitude of the difference between the first feature vector FV1 and the second feature vector FV2 is less than the magnitude of the difference between the first feature vector FV1 and the third feature vector FV3. L2-norm may be used to calculate the magnitudes of vectors, but the disclosure is not limited thereto.

For example, when the second training image T2 is the same as the first training image T1 and the third training image T3 is an image obtained by blurring the background of the first training image T1, the first neural network 410 may be trained such that the magnitude of the difference between the first feature vector FV1 and the second feature vector FV2 is less than the magnitude of the difference between the first feature vector FV1 and the third feature vector FV3.

For example, when the standard deviation of a Gaussian blur of the first training image T1 is 1.1, the second training image T2 is a first training image T1 of which standard deviation has been increased to 1.8, and the third training image T3 is a first training image T1 of which standard deviation has been increased to 3, the first neural network 410 may be trained such that the magnitude of the difference between the first feature vector FV1 and the second feature vector FV2 is less than the magnitude of the difference between the first feature vector FV1 and the third feature vector FV3.

According to an embodiment of the disclosure, a first feature vector, a second feature vector, and a third feature vector for a first input image, a second input image, and a third input image, respectively, may be inferred by the trained first neural network 410. When the second input image is the same as the first input image and the third input image is an image obtained by adding a pictorial depth cue to the first input image, a magnitude of a difference between the inferred first feature vector and the inferred second feature vector is less than a magnitude of a difference between the inferred first feature vector and the inferred third feature vector. When the second input image is an image with a relatively small level difference of a pictorial depth cue from the first input image and the third input image is an image with a relatively large level difference of a pictorial depth cue from the first input image, the magnitude of the difference between the inferred first feature vector and the inferred second feature vector is less than the magnitude of the difference between the inferred first feature vector and the inferred third feature vector.

As the first neural network 410 is trained to separate training images including the same (or relatively similar) levels of pictorial depth cues from training images including different (or relatively dissimilar) levels of pictorial depth cues, information about pictorial depth cues may be projected onto the feature map of a hidden layer and the feature vector of an output layer of the first neural network 410. In other words, the information about pictorial depth cues may be projected onto the feature map and the feature vector of the first neural network 410 without using a method of directly inferring the depth of an image like a depth map.

Figure 5:
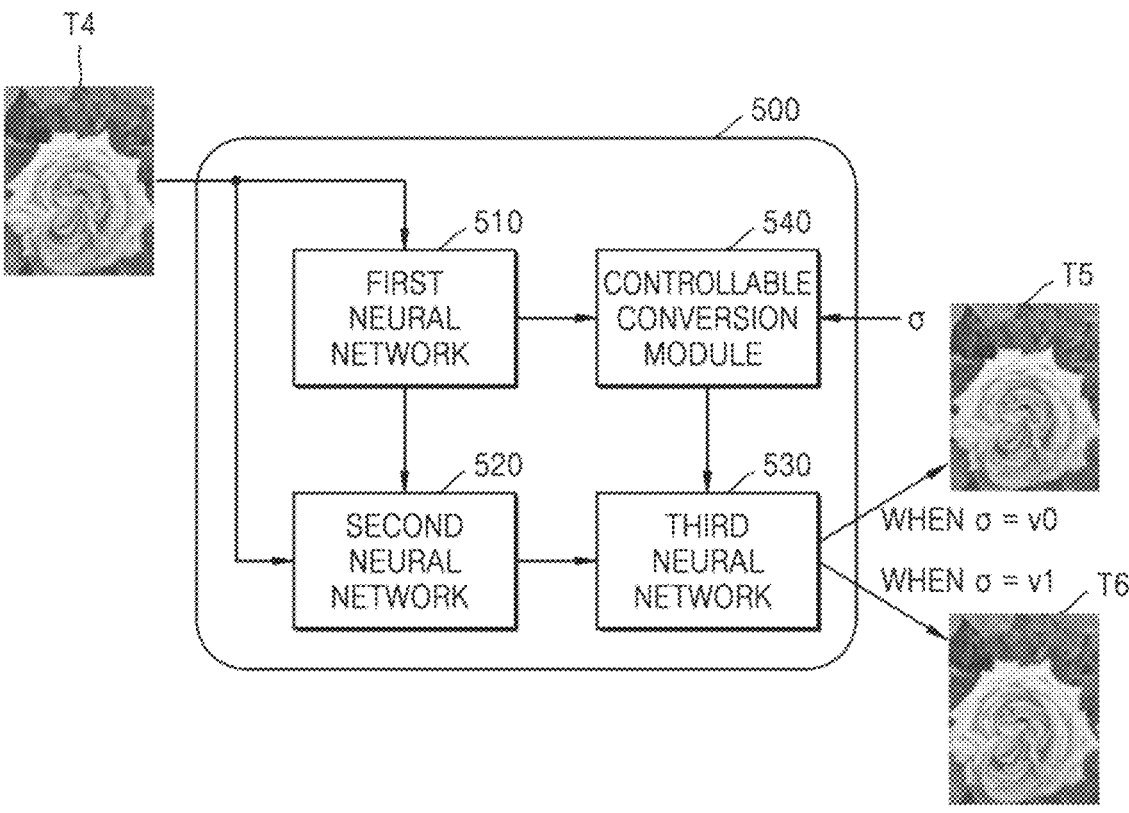
FIG. 5 is a diagram illustrating training of a deep neural network according to an embodiment of the disclosure.

FIG. 5 is a diagram illustrating training of a deep neural network 500 according to an embodiment of the disclosure.

The deep neural network 500 may be trained to output an image with different levels of pictorial depth cues according to control parameters. An intermediate form of learning between unsupervised learning and supervised learning may be used to train the deep neural network 500. Semi-supervised learning may be used to train the deep neural network 500. According to semi-supervised learning, ground truth labels for some data points may be used to train the deep neural network 500. Ground truth images for some control parameters may be used to train the deep neural network 500.

The same image as a training image or an image obtained by adding a pictorial depth cue to the training image may be used as a ground truth image used to train the deep neural network 500. The types, number, or levels of pictorial depth cues added to the training image are not limited. For example, the ground truth image may be an image obtained by adding a blur to the training image or an image obtained by adding a blur and a contrast to the training image. For example, the ground truth image may be a training image having a background of which the standard deviation of a Gaussian blur is 3, or a training image having a background of which the standard deviation of the Gaussian blur is 1.2.

A pre-trained first neural network 510 may be used to train the deep neural network 500. In the training of the deep neural network 500, a second neural network 520, a third neural network 530, and a controllable conversion module 540 may be training targets.

A control parameter a, a training image T4, a first ground truth image T5, and a second ground truth image T6 may be used to train the deep neural network 500 according to an embodiment of the disclosure. The control parameter a may be a single variable.

The first ground truth image T5 may be the same as the training image T4. The second ground truth image T6 may be an image obtained by adding a pictorial depth cue to the training image T4. For example, the first ground truth image T5 may be the same as the training image T4, and the second ground truth image T6 may be a training image T4 with a blurred background. Alternatively, the first ground truth image T5 may be an image having a relatively small level difference of a pictorial depth cue from the training image T4, and the second ground truth image T6 may be an image having a relatively large level difference of a pictorial depth cue from the training image T4. For example, the training image T4, the first ground truth image T5, and the second ground truth image T6 are images different from each other only in a contrast ratio, and the value of the contrast ratio of the training image T4 may be 500, the value of the contrast ratio of the first ground truth image T5 may be 800, and the value of the contrast ratio of the second ground true image T6 may be 1200.

When the control parameter a has a value of v0, the deep neural network 500 may be trained by labeling the first ground truth image T5 with respect to an input of the training image T4. When the control parameter a has a value of v1, the deep neural network 500 may be trained by labeling the second ground truth image T6 with respect to the input of the training image T4.

The deep neural network 500 trained according to an embodiment of the disclosure may infer output images with different levels of pictorial depth cues according to control parameters σ. For convenience of description, it is assumed that the training image T4 is used as a test image. In this case, when the control parameter σ having v0 is input to the deep neural network 500, the first ground truth image T5 may be inferred, and, when the control parameter σ having v1 is input to the deep neural network 500, the second ground truth image T6 may be inferred. Furthermore, when a control parameter σ having a value between v0 and v1 is input to the deep neural network 500, an image with a pictorial depth clue of a level between the levels of respective pictorial depth clues of the first ground truth image T5 and the second ground truth image T6 may be inferred.

For example, it is assumed that the value of the contrast ratio of the training image T4 used to train the deep neural network 500 is 500, the first ground truth image T5 is the same as the training image T4, the second ground truth image T6 is a training image T4 of which a contrast ratio is increased to a value of 1500, v0 is 0, and v1 is 1. For convenience of description, it is assumed that the training image T4 is used as a test image. In this case, when the control parameter σ is 0, the deep neural network 500 may infer the first ground true image T5 of which a contrast ratio has a value of 500. When the control parameter σ is 1, the deep neural network 500 may infer the second ground true image T6 of which a contrast ratio has a value of 1500.

When the control parameter σ is a value between 0 and 1, the deep neural network 500 may infer an image of which a contrast ratio has a value between 500 and 1500.

In the deep neural network 500 trained according to an embodiment of the disclosure, the levels of a plurality of pictorial depth cues included in an output image may be adjusted at once by adjusting the control parameter a, which is a single variable.

For example, it is assumed that the value of the contrast ratio of the training image T4 used to train the deep neural network 500 is 500, the standard deviation of the Gaussian blur is 0.5, the first ground truth image T5 is the same as the training image T4, the second ground truth image T6 is a training image T4 of which the value of the contrast ratio has been increased to 1500 and of which the standard deviation of the Gaussian blur has been increased to 1.5, v0 is 0, and v1 is 1. For convenience of description, it is assumed that the training image T4 is used as a test image. In this case, when the control parameter σ is 0, the deep neural network 500 may infer the first ground true image T5 of which a contrast ratio has a value of 500 and the standard deviation of the Gaussian blur is 0.5. When the control parameter σ is 1, the deep neural network 500 may infer the second ground true image T6 of which a contrast ratio has a value of 1500 and the standard deviation of the Gaussian blur is 1.5. When the control parameter σ is a value between 0 and 1, the deep neural network 500 may infer an image of which a contrast ratio has a value between 500 and 1500 and the standard deviation of the Gaussian blur is between 0.5 and 1.5.

In the embodiment of FIG. 5, the deep neural network 500 is trained with respect to two control parameters a of v0 and v1. However, the number of control parameters a used for training is not limited thereto. The deep neural network 500 is also trained with respect to control parameters σ of 0 and 1. However, the values of the control parameters σ used for training are not limited thereto.

Figure 6:
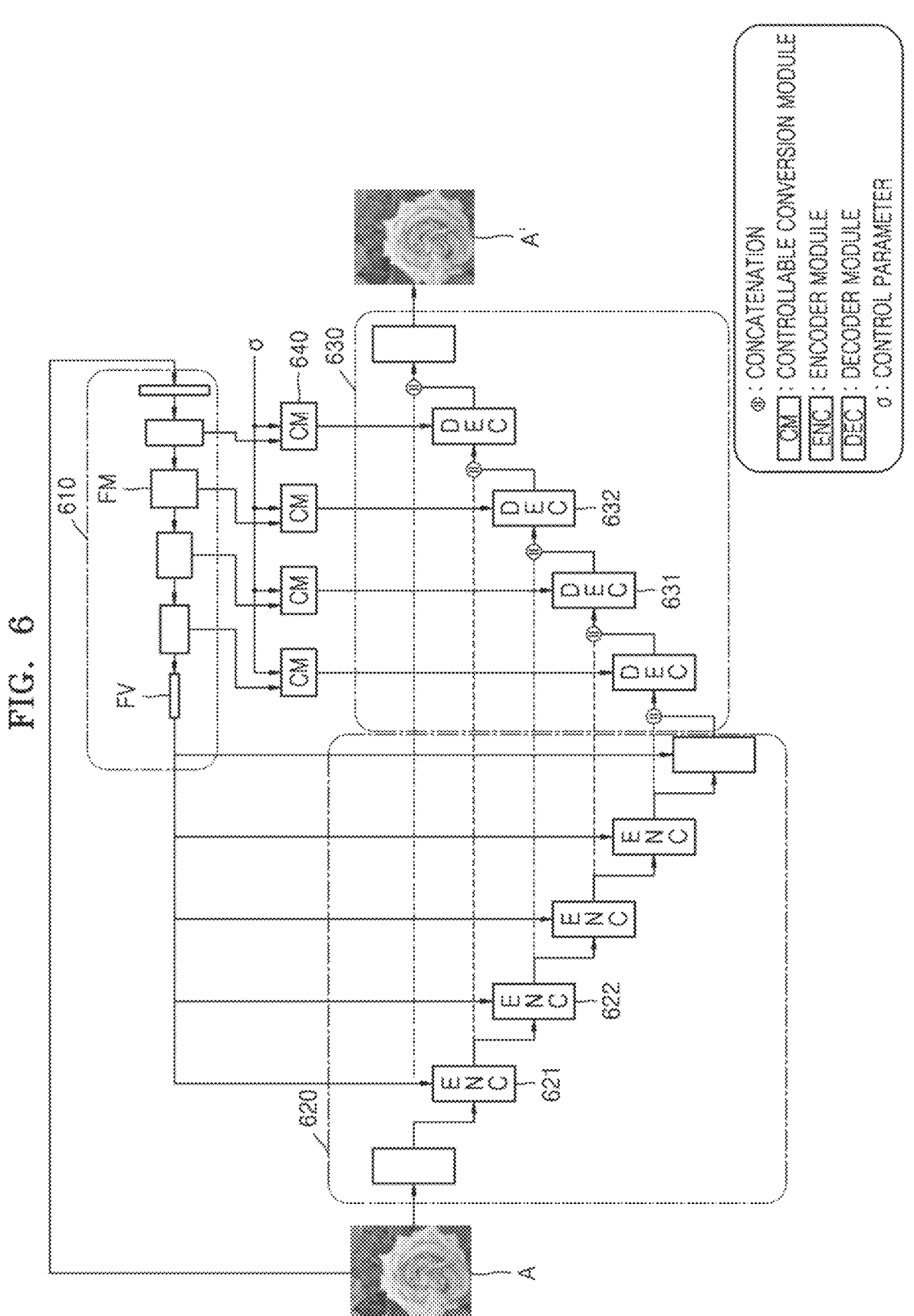
FIG. 6 is a diagram of a first neural network, a second neural network, a third neural network, and a controllable conversion module according to an embodiment of the disclosure.

FIG. 6 is a diagram of a first neural network, a second neural network, a third neural network, and a controllable conversion module according to an embodiment of the disclosure. FIG. 6 illustrates a first neural network 610, a second neural network 620, a third neural network 630, and a controllable conversion module 640 according to an embodiment of the disclosure.

The first neural network 610 may receive an input image A and output a feature vector FV through layers. The feature vector FV of the first neural network 610 and a feature map FM of a hidden layer may include information associated with a pictorial depth cue.

The second neural network 620 may receive the input image A, and may reduce spatial resolution of the input image A to output a feature map. The second neural network 620 may include a sequence of encoder modules for reducing the spatial resolution of the input image A.

An encoder module 622 may be configured to generate an output feature map from an input feature map, based on downsampling. The encoder module 622 may be further configured to combine the input feature map with the feature vector FV of the first neural network 610 to generate the output feature map.

The encoder module 622 may receive an output feature map of a preceding encoder module 621, as the input feature map. The encoder module 622 may generate an intermediate feature map from the input feature map, through at least one layer. The encoder module 622 may combine the intermediate feature map with the feature vector FV to generate a combined feature map, and may downsample the combined feature map to generate the output feature map.

As the intermediate feature map of the encoder module 622 is combined with the feature vector FV of the first neural network 610, information about a pictorial depth cue included in the feature vector FV may be combined with the output feature map of the encoder module 622. In addition, as the combined output feature map of the encoder module 622 is downsampled and thus the output feature map of the encoder module 622 is generated, the output feature map having a reduced spatial resolution compared to the input feature map may be obtained.

The controllable conversion module 640 may receive the feature map FM of the hidden layer of the first neural network 610. The controllable conversion module 640 may convert the feature map FM, based on the control parameter a, and may transmit a converted feature map corresponding to a result of the conversion to the third neural network 630.

The third neural network 630 may output an output image A' by increasing the spatial resolution of the input feature map. The input feature map may be an output of the second neural network 620. The third neural network 630 may include a sequence of decoder modules for increasing the spatial resolution of the input feature map.

A decoder module 632 may be configured to generate an output feature map from an input feature map, based on upsampling. The decoder module 632 may be further configured to use the converted feature map of the first neural network 610 received from the controllable conversion module 640 to generate the output feature map.

The decoder module 632 may receive an output feature map of a preceding decoder module 631, as the input feature map. The decoder module 632 may upsample the input feature map. The decoder module 632 may generate an intermediate feature map from an upsampled input feature map, through at least one layer. Transpose convolution may be used for upsampling, but the disclosure is not limited thereto. The feature map of the encoder module 622 may be used to generate the intermediate feature map of the decoder module 632. The intermediate feature map of the decoder module 632 may be generate by concatenating the upsampled input feature map of the decoder module 632 with the feature map of the encoder module 622. The decoder module 632 may combine the intermediate feature map with the converted feature map of the first neural network 610 received from the controllable conversion module 640 to generate a combined feature map. The decoder module 632 may generate the output feature map from the combined feature map, through at least one layer.

As the intermediate feature map of the decoder module 632 is combined with the feature map FM of the first neural network 610, information about a pictorial depth cue included in the feature map FM may be combined with the output feature map of the decoder module 632. In addition, as the input feature map of the decoder module 632 is upsampled and thus the output feature map of the decoder module 632 is generated, an output feature map having an increased spatial resolution compared to the input feature map may be obtained.

As the feature vector FV and the feature map FM of the first neural network 610 are combined with the feature maps having reduced spatial resolution compared to the input image A of the second neural network 620 and the third neural network 630, information about the pictorial depth cues included in the feature vector FV and the feature map FM may be effectively reflected in the output image A'.

Figure 7:
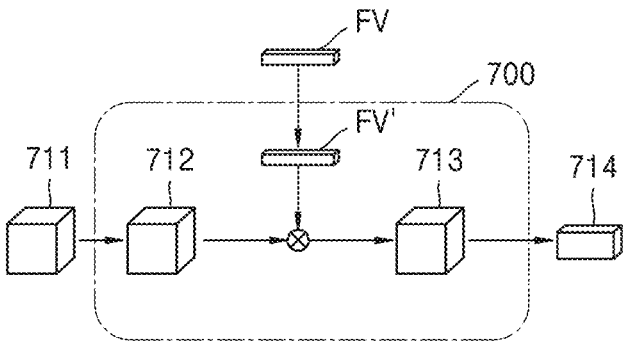
FIG. 7 is a diagram of an encoder module according to an embodiment of the disclosure.

FIG. 7 is a diagram of an encoder module 700 according to an embodiment of the disclosure.

The encoder module 700 according to an embodiment of the disclosure generates an output feature map 714 from an input feature map 711, based on downsampling. The encoder module 700 may receive an output feature map of a preceding encoder module. The output feature map of the preceding encoder module may be used as the input feature map 711 of the encoder module 700.

The encoder module 700 may generate an intermediate feature map 712 from the input feature map 711, through at least one layer. For example, the encoder module 700 may generate the intermediate feature map 712 from the input feature map 711, through a convolutional layer.

The encoder module 700 may receive a feature vector FV output by a first neural network. The encoder module 700 may convert the size of the feature vector FV. The encoder module 700 may convert the size of the feature vector FV such that the number of channels of the intermediate feature map 712 is the same as a length of the feature vector FV.

The encoder module 700 may generate a combined feature map 713 by combining the intermediate feature map 712 with a size-converted feature vector FV'. The intermediate feature map 712 and the size-converted feature vector FV' may be combined with each other by element-wise multiplication. The encoder module 700 may generate the output feature map 714 by downsampling the combined feature map 713. For example, convolution or pooling may be used for downsampling, but the disclosure is not limited thereto.

Figure 8:
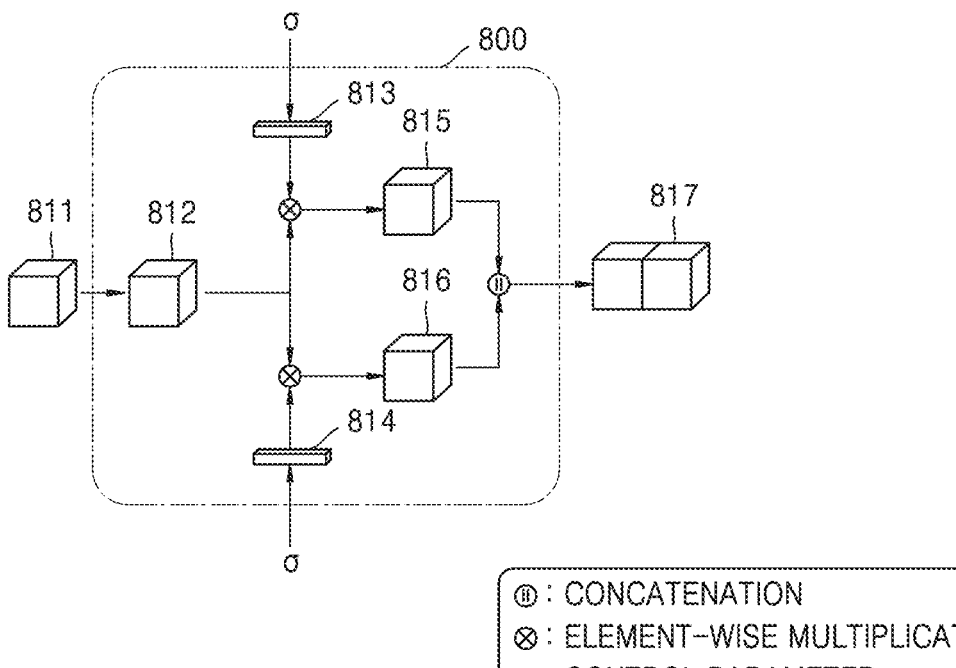
FIG. 8 is a diagram of a controllable conversion module according to an embodiment of the disclosure.

FIG. 8 is a diagram of a controllable conversion module 800 according to an embodiment of the disclosure.

The controllable conversion module 800 may receive a feature map 811 of a hidden layer of a first neural network and a control parameter σ.

The controllable conversion module 800 may obtain a first feature map 812 from the received feature map 811. For example, the received feature map 811 may be used as the first feature map 812. For example, the controllable conversion module 800 may generate the first feature map 812 from the received feature map 811, through at least one layer. For example, the controllable conversion module 800 may generate the first feature map 812 from the received feature map 811, through a convolutional layer.

The controllable conversion module 800 may generate a first weight vector 813 and a second weight vector 814 from the control parameter σ. The first weight vector 813 may be expressed as Equation (2), and the second weight vector 814 may be expressed as Equation (3).

$$\cos(\sigma \overline{w} + \overline{b}) \tag{2}$$

$$\sin(\sigma \overline{w} + \overline{b}) \tag{3}$$

In Equations (2) and (3), σ indicates a control parameter, $\overline{w}$ indicates a weight in a vector form, and $\overline{b}$ indicates a bias in a vector form.

A sum of the squares of respective norms of the first weight vector 813 and the second weight vector 814 may be constant. When the first weight vector 813 and the second weight vector 814 are implemented as Equations (2) and (3), the sum of the squares of the respective norms of the first weight vector 813 and the second weight vector 814 is 1.

The controllable conversion module 800 may generate a second feature map 815 via element-wise multiplication of the first feature map 812 and the first weight vector 813, and may generate a third feature map 816 via element-wise multiplication of the first feature map 812 and the second weight vector 814. As the first weight vector 813 and the second weight vector 814 are implemented as Equations (2)

and (3), the first feature map 812 may be rotated by the first weight vector 813, and thus the second feature map 815 may be generated. The first feature map 812 may also be rotated by the second weight vector 814, and thus the third feature map 816 may be generated. In addition, a degree to which the first feature map 812 is rotated may be adjusted by the control parameter σ.

The controllable conversion module 800 may concatenate the second feature map 815 with the third feature map 816. A concatenated feature map 817 may be provided as a converted feature map of the hidden layer of the first neural network to a third neural network.

When the first weight vector 813 and the second weight vector 814 are implemented as Equations (2) and (3), the sum of the squares of the respective norms of the first weight vector 813 and the second weight vector 814 may be constant as 1 even when the control parameter σ changes. Accordingly, the norm of the first feature map 812 may be the same as the norm of the concatenated feature map 817, regardless of the value of the control parameter σ. Therefore, the stability of training and inference of a deep neural network for the changing control parameter σ may be guaranteed.

As the control parameter σ is used as shown in Equations (2) and (3), a degree to which the first feature map 812 is rotated may be periodic with an increase in the control parameter σ. In other words, as the control parameter σ is increased, the concatenated feature map 817 may change periodically. In other words, as the control parameter σ is increased, the feature map of the hidden layer of the first neural network may change periodically.

Figure 9:
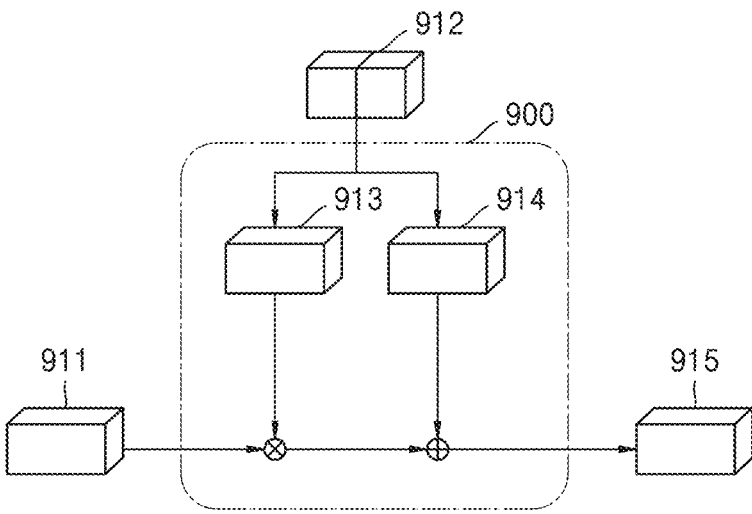
FIG. 9 is a diagram of an element-wise operation module according to an embodiment of the disclosure.

FIG. 9 is a diagram of an element-wise operation module 900 according to an embodiment of the disclosure.

The element-wise operation module 900 according to an embodiment of the disclosure is configured to generate an output feature map 915 by converting an input feature map 911 for each element, based on a condition feature map 912. For example, the element-wise operation module 900 may be composed of a spatial feature transform (SFT) layer.

The element-wise operation module 900 may generate a scale feature map 913 from the condition feature map 912, through at least one layer. The element-wise operation module 900 may also generate a shift feature map 914 from the condition feature map 912, through at least one layer. The at least one layer may include a convolutional layer or an activation layer.

The element-wise operation module 900 may generate the output feature map 915 by performing an element-wise multiplication of the input feature map 911 by the scale feature map 913 and then performing an element-wise summation of a result of the element-wise multiplication with the shift feature map 914.

The element-wise operation module 900 may be configured differently from that shown in FIG. 9. For example, the element-wise operation module 900 may be configured such that the scale feature map 913 and processing of an element-wise multiplication are omitted. For example, the element-wise operation module 900 may be configured such that the shift feature map 914 and processing of an element-wise summation are omitted. For example, the element-wise operation module 900 may be configured to include processing of element-wise multiplication by an additional scale feature map or processing of element-wise summation by an additional shift feature map.

Figure 10:
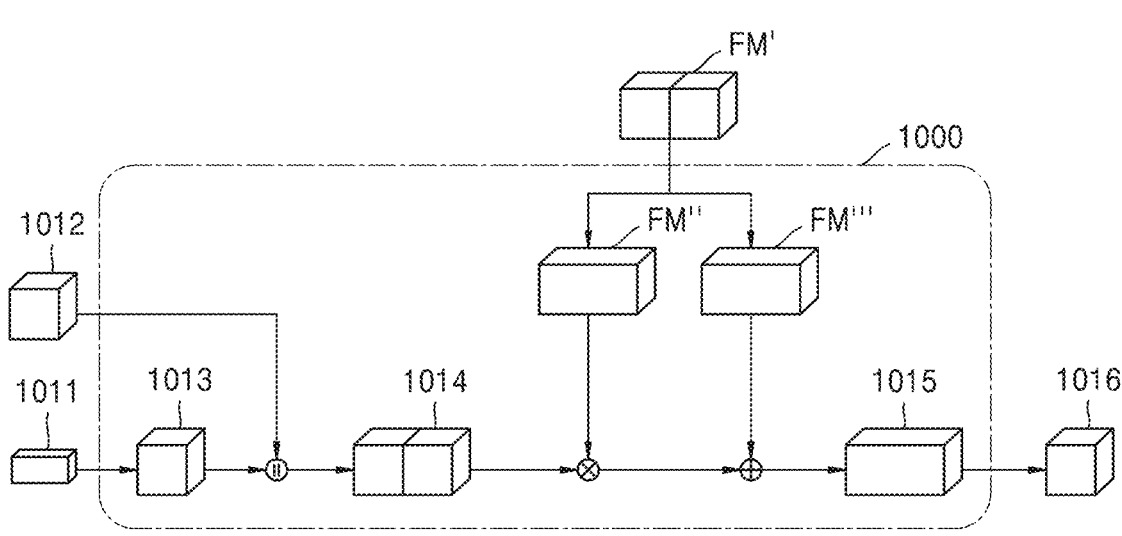
FIG. 10 is a diagram of a decoder module according to an embodiment of the disclosure.

FIG. 10 is a diagram of a decoder module 1000 according to an embodiment of the disclosure.

The decoder module 1000 according to an embodiment of the disclosure may generate an output feature map 1016 from an input feature map 1011, based on upsampling. The decoder module 1000 may receive an output feature map of a preceding decoder module. The output feature map of the preceding decoder module may be used as the input feature map 1011 of the decoder module 1000.

The decoder module 1000 may upsample the input feature map 1011. Transpose convolution may be used for upsampling, but the disclosure is not limited thereto.

The decoder module 1000 may receive a feature map 1012 of an encoder module. The decoder module 1000 may generate an intermediate feature map 1014 by concatenating the upsampled input feature map 1013 with the feature map 1012 of the encoder module. The feature map 1012 of the encoder module may be an intermediate feature map of the encoder module, but the disclosure is not limited thereto.

The decoder module 1000 may receive, from a controllable conversion module, a feature map FM' of a hidden layer of a first neural network corresponding to a result of the conversion by the controllable conversion module. The intermediate feature map 1014 and the feature map FM' may be combined with each other by an element-wise operation. The decoder module 1000 may generate a scale feature map FM" and a shift feature map FM'" by converting the size of the feature map FM', through at least one layer. Each of respective sizes of the scale feature map FM" and the shift feature map FM'" may be the same as the size of the intermediate feature map 1014. The decoder module 1000 may generate a combined feature map 1015 by performing an element-wise multiplication of the intermediate feature map 1014 by the scale feature map FM" and then performing an element-wise summation of a result of the element-wise multiplication with the shift feature map FM'".

The decoder module 1000 may generate an output feature map 1016 from the combined feature map 1015, through at least one layer. For example, the decoder module 1000 may generate the output feature map 1016 from the combined feature map 1015 through a convolutional layer.

Figure 11:
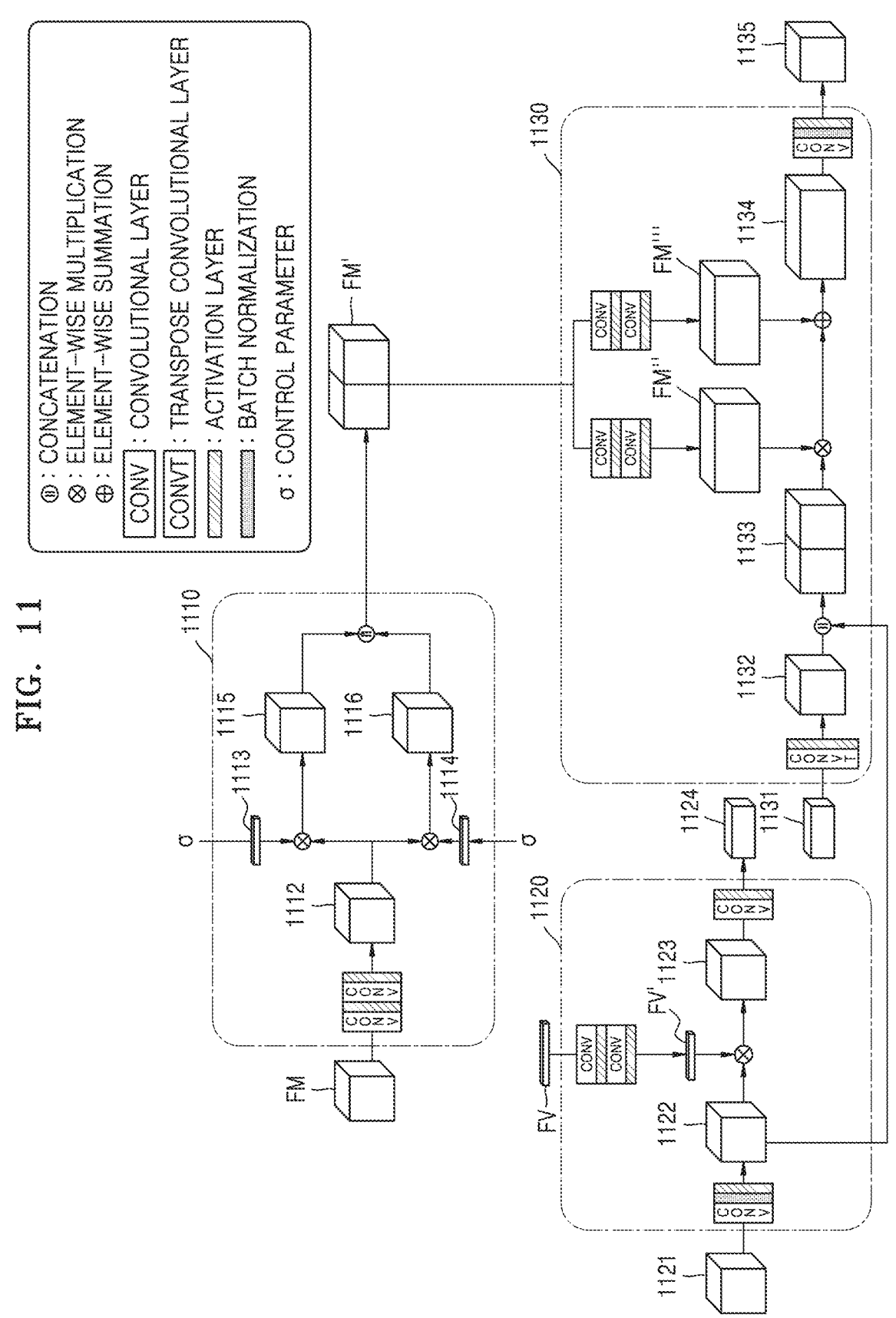
FIG. 11 is a diagram of a controllable conversion module, an encoder module, and a decoder module according to an embodiment of the disclosure.

FIG. 11 is a diagram of a controllable conversion module, an encoder module, and a decoder module according to an embodiment of the disclosure. That is, FIG. 11 is a view of a controllable conversion module 1110, an encoder module 1120, and a decoder module 1130 according to an embodiment of the disclosure.

The controllable conversion module 1110 may receive a feature map FM of a hidden layer of a first neural network. A first feature map 1112 may be generated from the feature map FM through convolutional layers and activation layers.

The controllable conversion module 1110 may receive a control parameter σ and generate a first weight vector 1113 and a second weight vector 1114 from the control parameter σ. The controllable conversion module 1110 may generate a second feature map 1115 via element-wise multiplication of the first feature map 1112 and the first weight vector 1113, and may generate a third feature map 1116 via element-wise multiplication of the first feature map 1112 and the second weight vector 1114. The first feature map 1112 may be converted by the first and second weight vectors 1113 and 1114, and the degree of the conversion may be adjusted by the control parameter σ.

The controllable conversion module 1110 may concatenate the second feature map 1115 with the third feature map 1116 to generate an output feature map FM'. The output feature map FM' may be a feature map of the hidden layer of the first neural network corresponding to a result of the conversion by the controllable conversion module 1110.

The encoder module 1120 may receive an output feature map of a preceding encoder module as an input feature map 1121. The encoder module 1120 may generate an intermediate feature map 1122 from the input feature map 1121, through a convolutional layer, an activation layer, and batch normalization.

The encoder module 1120 may receive a feature vector FV output by the first neural network. The encoder module 1120 may convert the size of the feature vector FV according to the number of channels of the intermediate feature map 1122, through convolutional layers and activation layers.

The encoder module 1120 may generate a combined feature map 1123 from an element-wise multiplication of the intermediate feature map 1122 with a size-converted feature vector FV'. Because the combined feature map 1123 is a result of combining the intermediate feature map 1122 generated from the input feature map 1121 with the feature vector FV' generated from the feature vector FV, the combined feature map 1123 is a result of combining the input feature map 1121 with the feature vector FV.

The encoder module 1120 may generate an output feature map 1124 by downsampling the combined feature map 1123. A convolutional layer and an activation layer may be used for the downsampling.

The decoder module 1130 may receive an output feature map of a preceding decoder module as an input feature map 1131. The decoder module 1130 may upsample the input feature map 1131 through a transpose convolutional layer and an activation layer.

The decoder module 1130 may generate an intermediate feature map 1133 by concatenating an upsampled input feature map 1132 with a feature map of the encoder module 1120. In this case, the intermediate feature map 1122 may be used as the feature map of the encoder module 1120.

The decoder module 1130 may receive the feature map FM' of the hidden layer of the first neural network corresponding to a result of the conversion from the controllable conversion module 1110. The decoder module 1130 may generate feature maps FM" and FM'" each having the same size as the intermediate feature map 1133 from the feature map FM', through convolutional layers and activation layers.

The decoder module 1130 may generate a combined feature map 1134 by performing an element-wise multiplication of the intermediate feature map 1122 by the feature map FM" and then performing an element-wise summation of a result of the element-wise multiplication with the feature map FM'". Because the combined feature map 1134 is a result of combining the intermediate feature map 1133 generated from the input feature map 1131 with the feature maps FM" and FM'" generated from the feature map FM', the combined feature map 1134 is a result of combining the input feature map 1131 with the feature map FM'.

The decoder module 1130 may generate an output feature map 1135 from the combined feature map 1134, through a convolutional layer, batch normalization, and an activation layer.

In the embodiment shown in FIG. 11, an activation function used in the activation layer may be, but is not limited to, a Gaussian Error Liner Unit (GELU) or a ReLU.

FIG. 12 is a diagram illustrating a flow of feature maps from an input image to an output image, according to an embodiment of the disclosure.

In a first neural network 1210, a first feature map 1211, a second feature map 1212, a third feature map 1213, a fourth feature map 1214, and a fifth feature map 1215 may be sequentially generated from an input image A. The first feature map

1211, the second feature map 1212, the third feature map 1213, the fourth feature map 1214, and the fifth feature 1215 may be feature maps not yet subjected to pooling in respective hidden layers. Finally, the first neural network 1210 may output a feature vector 1216 through a fully connected layer.

The first neural network 1210 may be trained to classify feature vectors according to pictorial depth cues. Thus, the first feature map 1211, the second feature map 1212, the third feature map 1213, the fourth feature map 1214, the fifth feature 1215, and the feature vector 1216 of the first neural network 1210 may include information associated with pictorial depth cues.

In a second neural network 1220, feature maps 1224, 1225, and 1226 may be sequentially generated from the input image A. The feature maps 1224, 1225, and 1226 may be downsampled by a first encoder module 1221, a second encoder module 1222, and a third encoder module 1223, respectively. Finally, the second neural network 1220 may output a feature map 1227 obtained by downsampling the input image A.

The first encoder module 1221, the second encoder module 1222, and the third encoder module 1223 may combine the feature maps 1224, 1225, and 1226 with the feature vector 1216 of the first neural network 1210 during downsampling. As the feature maps 1224, 1225, and 1226 are combined with the feature vector 1216, the information about pictorial depth cues may be added to the finally-generated feature map 1227.

A first controllable conversion module 1241, a second controllable conversion module 1242, a third controllable conversion module 1243, and a fourth controllable conversion module 1244 may convert the fourth feature map 1214, the third feature map 1213, the second feature map 1212, and the first feature map 1211 of the first neural network 1210, respectively.

In a third neural network 1230, feature maps 1235, 1236, 1237, and 1238 may be sequentially generated from the feature map 1227 output by the second neural network 1220. The feature map 1235 may be generated by performing an element-wise operation on the feature map 1227 output by the second neural network 1220 and the fourth feature map 1214 converted by the first controllable conversion module 1241 using an element-wise operation module.

The feature maps 1235, 1236, and 1237 may be upsampled by a first decoder module 1232, a second decoder module 1233, and a third decoder module 1234, respectively. Finally, the third neural network 1230 may generate an output image A 'from the upsampled feature map 1238.

The first decoder module 1232 may combine the feature map 1235 with the third feature map 1213 converted by the second controllable conversion module 1242. The second decoder module 1233 may combine the feature map 1236 with the second feature map 1212 converted by the third controllable conversion module 1243. The third decoder module 1234 may combine the feature map 1237 with the first feature map 1211 converted by the fourth controllable conversion module 1244. As the feature maps 1235, 1236, and 1237 are combined with the first feature map 1211, the second feature map 1212, and the third feature map 1213, the information about pictorial depth cues may be added to the finally-generated output image A'.

In the description given above with reference to FIG. 8, as the control parameter σ is increased, the feature map of the hidden layer of the first neural network changes periodically. Similarly, as the control parameter σ is increased, the first feature map 1211, the second feature map 1212, and the third feature map 1213 may be periodically converted. Accordingly, as the control parameter σ is increased, the level of a pictorial depth cue of the output image A' may be periodically changed.

FIG. 12 schematically illustrates respective structures of the first neural network 1210, the second neural network 1220, and the third neural network 1230, and the respective structures of the first neural network 1210, the second neural network 1220, and the third neural network 1230 are not limited those illustrated in FIG. 12.

Figure 13:
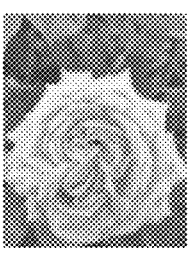
FIG. 13 is a diagram of output images including an amount of pictorial depth cues adjusted by control parameters, according to an embodiment of the disclosure.
Figure 13:
Figure 13:
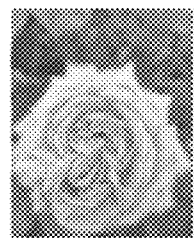
Figure 13:
Figure 13:

FIG. 13 is a diagram of output images including a quantity of pictorial depth cues adjusted by control parameters, according to an embodiment of the disclosure.

For control parameters σ of 0.0 and 1.0, images with enhanced depth as perceived by a viewer were generated using a deep neural network subjected to semi-supervised learning. The control parameter σ was input as 0.0, 0.25, 0.5, 0.75, and 1.0 in inference, and FIG. 13 shows output images generated in these cases, respectively.

By varying the control parameter σ, output images with different levels of pictorial depth cues were generated. When the control parameter σ was 0.0, the same image as an input image was output, and, when the control parameter σ was 1.0, an image having a largest level difference in pictorial input cues from the input image was output. As the control parameter σ was sequentially increased to 0.25, 0.5, 0.75, and 1.0, images in which the levels of pictorial input cues were sequentially increased were output.

Figure 14:
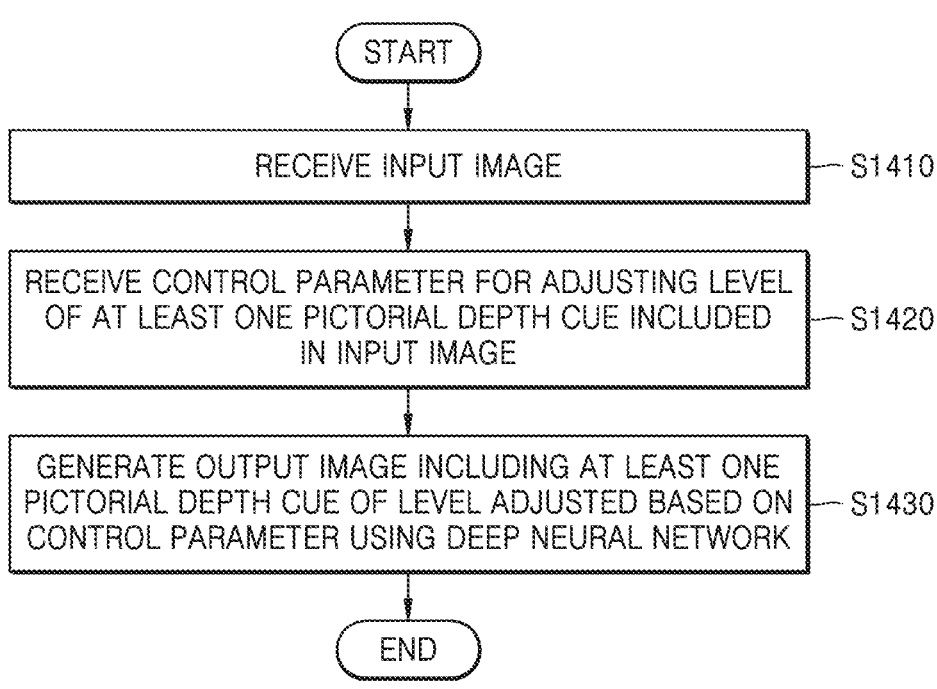
FIG. 14 is a flowchart of a method of generating an image with an enhanced depth as perceived by a viewer, according to an embodiment of the disclosure.

FIG. 14 is a flowchart of a method of creating an image with an enhanced depth as perceived by a viewer, according to an embodiment of the disclosure.

In operation S1410, the processor 210 may receive an input image. The input image may be received by a user or may be loaded from the memory 220.

In operation S1420, the processor 210 may receive a control parameter for adjusting the level of at least one pictorial depth cue included in the input image. The viewer may select and input a control parameter in order to generate an output image having a desired level of pictorial input cue. The processor 210 may receive a control parameter selected by the user.

In operation S1430, the processor 210 may generate an output image including at least one pictorial depth cue of a level adjusted based on the control using a deep neural network. Output images including pictorial depth cues of different levels may be generated according to the values of the control parameter. For example, when the value of the control parameter is small, the level of the pictorial depth cue included in the output image may be relatively low, and, when the value of the control parameter is large, the level of the pictorial depth cue included in the output image may be relatively high.

Different types of pictorial depth cues may be included in an output image, and the levels of the different types of pictorial depth cues included in the output image may be adjusted by adjusting a control parameter which is a single variable. For example, contrast and blur may be included in the output image, and, as the control parameter is changed from 0 to 1, respective levels of the contrast and the blur included in the output image may be both increased.

Figure 15:
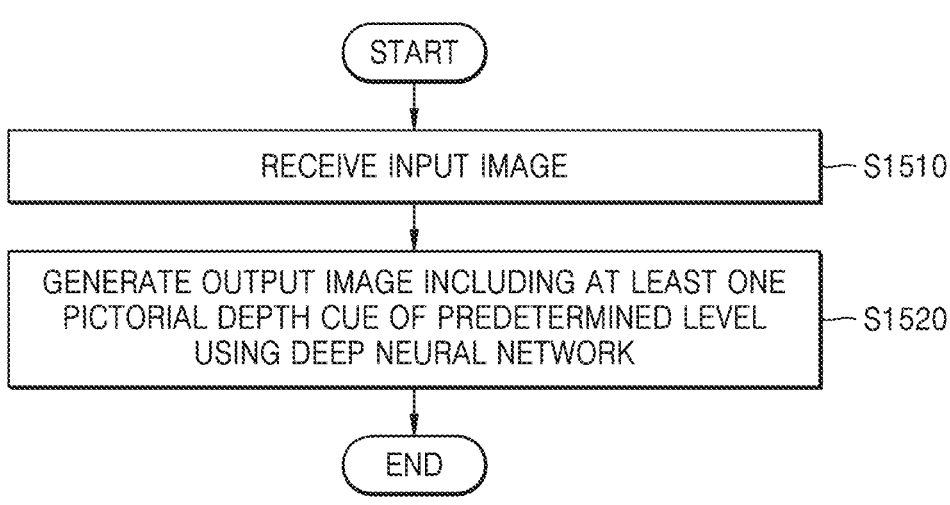
FIG. 15 is a flowchart of a method of generating an image with an enhanced depth as perceived by a viewer, according to an embodiment of the disclosure.

FIG. 15 is a flowchart of a method of creating an image with an enhanced depth as perceived by a viewer, according to an embodiment of the disclosure.

When a control parameter has a fixed value, the processor 210 may generate an output image including at least one pictorial depth cue of a fixed level. In this case, the control parameter may be fixed as a constant in the previous embodiments. In this case, the processor 210 may receive an input image in operation S1510, and may generate an output image including at least one image depth clue of a predetermined level using a deep neural network in operation S1520.

According to the above embodiments, as the output image to which the pictorial depth cue has been added is generated, the depth as perceived by the viewer may be enhanced. As the level of the pictorial depth cue included in the output image is adjusted through the control parameter, the depth as perceived by the viewer may be changed. In addition, as a deep neural network configured to output an image including a pictorial depth cue without directly inferring the depth, such as a depth map, is used, an error occurring during processing of the depth map may prevent incorrect depth information from being added to the output image.

The electronic device 200 according to the above embodiments may generate an output image to which a pictorial depth cue having a level adjusted by the control parameter has been added. Based on the above embodiments, the electronic device 200 may be configured to generate an output image changed to a degree adjusted by the control parameter. When the third training image T3 of FIG. 4 is an image obtained by changing the first training image T1 and the second ground truth image T6 of FIG. 5 is an image obtained by changing the training image T4, the deep neural network of the electronic device 200 trained based on the embodiments of FIGS. 4 and 5 may generate an output image by changing an input image to the degree adjusted by the control parameter.

An electronic device 200 for creating a changed image, according to an embodiment of the disclosure, may include a memory 220 storing one or more instructions, and one or more processors 210 configured to execute the one or more instructions to receive an input image, receive a control parameter for adjusting a degree to which an output image is changed from the input image, and generate an output image changed to the degree changed by the control parameter from the input image using a deep neural network. The deep neural network may include a first neural network configured to receive the input image and output a feature vector for the input image, a second neural network configured to receive the input image, and output a feature map by reducing a spatial resolution of the input image, a third neural network configured to receive the feature map output by the second neural network, and generate the output image by increasing a spatial resolution of the feature map output by the second neural network, and at least one controllable conversion module configured to convert a feature map, based on the control parameter. The second neural network may be configured such that a feature map of at least one hidden layer of the second neural network is combined with the feature vector output by the first neural network. The at least one controllable conversion module may be configured to receive a feature map of a hidden layer of the first neural network, and convert and output the received feature map of the hidden layer of the first neural network, based on the control parameter. The third neural network may be configured such that a feature map of at least one hidden layer of the third neural network is combined with the converted feature map of the hidden layer of the first neural network.

For example, a change from a black and white image to a color image, a change in the thickness of an object's outline on an image, a change in color, image filtering, etc., may be performed as an image change by the electronic device 200, but the disclosure is not limited thereto. Various image changes may be performed by the electronic device 200.

A method of creating an image with an enhanced depth as perceived by a viewer, according to an embodiment of the disclosure, may be implemented as program commands executable by various computer implementations and may be recorded on a computer-readable medium. The computer-readable medium may include program commands, data files, data structures, and the like separately or in combinations. The program commands to be recorded on the computer-readable medium may be specially designed and configured for the disclosure or may be well-known to and usable by one of ordinary skill in the art of computer software. Examples of a computer-readable recording medium include a magnetic medium such as a hard disk, a floppy disk, or a magnetic tape, an optical medium such as a compact disk-read-only memory (CD-ROM) or a digital versatile disk (DVD), a magneto-optical medium such as a floptical disk, and a hardware device specially configured to store and execute program commands such as a ROM, a random-access memory (RAM), or a flash memory. Examples of the program commands are high-level language codes that can be executed by a computer using an interpreter or the like as well as machine language codes made by a compiler.

Methods of creating an image with an enhanced depth as perceived by a viewer, according to the disclosed embodiments, may be provided in a computer program product. The computer program product, which is a commodity, may be traded between sellers and buyers.

The computer program product may include a software program and a computer-readable storage medium having the software program stored thereon. For example, the computer program product may include a product in the form of a software program (e.g., a downloadable app) that is electronically distributed through the manufacturer of an electronic device or an electronic market (e.g., Google Play Store, AppStore). For electronic distribution, at least a portion of the software program may be stored on a storage medium or may be created temporarily. In this case, the storage medium may be a server of a manufacturer, a server of an electronic market, or a storage medium of a relay server for temporarily storing an SW program.

The computer program product may include, in a system including a server and a client device, a storage medium of the server or a storage medium of the client device. Alternatively, if there is a third device (e.g., a smartphone) in communication with the server or client device, the computer program product may include a storage medium of the third device. Alternatively, the computer program product may include the software program itself transmitted from the server to the client device or the third device, or transmitted from the third device to the client device.

In this case, one of the server, the client device, and the third device may execute the computer program product to perform the methods according to the disclosed embodiments. Alternatively, at least two of the server, the client device, and the third device may execute the computer program product to distribute and perform the methods according to the disclosed embodiments.

For example, a server (e.g., a cloud server or an artificial intelligence server) may execute a computer program product stored on a server to control a client device communicating with the server to perform the methods according to the disclosed embodiments.

While one or more embodiments of the disclosure have been described with reference to the figures, it will be understood by those of ordinary skill in the art that various changes in form and details may be made therein without departing from the spirit and scope as defined by the following claims.

What is claimed is:

1. An electronic device for generating an image with an enhanced depth as perceived by a viewer, the electronic device comprising:
   at least one memory storing instructions; and
   at least one processor configured to execute the instructions to:
      receive an input image;
      receive a control parameter for adjusting a first level of at least one pictorial depth cue included in the input image; and
      generate an output image comprising the at least one pictorial depth cue at a second level that is adjusted from the first level based on the control parameter using a deep neural network,
   wherein the deep neural network comprises:
      a first neural network configured to receive the input image and output a feature vector corresponding to the input image;
      a second neural network configured to receive the input image, and generate a feature map by reducing a spatial resolution of the input image;
      a third neural network configured to receive the feature map output by the second neural network, and generate the output image by increasing a spatial resolution of the feature map output by the second neural network; and
      at least one controllable conversion module configured to:
         receive a feature map of a hidden layer of the first neural network; and
         convert the feature map of the hidden layer of the first neural network, based on the control parameter,
   wherein the second neural network is further configured to combine a feature map of a hidden layer of the second neural network with the feature vector output by the first neural network, and
   wherein the third neural network is further configured to combine a feature map of a hidden layer of the third neural network with the converted feature map of the hidden layer of the first neural network.

2. The electronic device of claim 1, wherein the at least one controllable conversion module is further configured to:
   generate a first feature map from the feature map of the hidden layer of the first neural network;
   generate a first weight vector and a second weight vector based on the control parameter;
   generate a second feature map based on element-wise multiplication of the first feature map and the first weight vector;
   generate a third feature map based on element-wise multiplication of the first feature map and the second weight vector; and
   generate the converted feature map of the hidden layer of the first neural network by concatenating the second feature map and the third feature map.

3. The electronic device of claim 2, wherein a norm of the first feature map is with the same as a norm of the converted feature map of the hidden layer of the first neural network.

4. The electronic device of claim 2, wherein a sum of squares of a norm of the first weight vector and a norm of the second weight vector is constant.

5. The electronic device of claim 1, wherein the second neural network comprises a sequence of a plurality of encoder modules configured to reduce the spatial resolution of the input image, and wherein at least one encoder module among the plurality of encoder modules is configured to generate an output feature map from an input feature map based on downsampling.

6. The electronic device of claim 5, wherein the at least one encoder module among the plurality of encoder modules is configured to:

receive a feature map of a previous encoder module in the sequence of the plurality of encoder modules as the input feature map;

generate an intermediate feature map of the at least one encoder module based on the input feature map through at least one layer;

generate a combined feature map of the at least one encoder module by combining the intermediate feature map with the feature vector received from the first neural network; and generate the output feature map of the at least one encoder module by downsampling the combined feature map.

7. The electronic device of claim 6, wherein the at least one encoder module among the plurality of encoder modules is further configured to:

convert a size of the feature vector received from the first neural network based on a number of channels of the intermediate feature map; and generate the combined feature map based on element-wise multiplication of the intermediate feature map with the size-converted feature vector output by the first neural network.

8. The electronic device of claim 1, wherein the third neural network further comprises a sequence of a plurality of decoder modules configured to generate the output image by increasing the spatial resolution of the feature map output by the second neural network, and wherein at least one decoder module among the plurality of decoder modules is configured to generate an output feature map from an input feature map, based on upsampling.

9. The electronic device of claim 8, wherein the at least one decoder module among the plurality of decoder modules is configured to:

receive an output feature map of a previous decoder module in the sequence of the plurality of decoder modules, as the input feature map of the at least one decoder module;

upsample the input feature map;

generate an intermediate feature map of the at least one decoder module based on the upsampled input feature map through at least one layer;

receive the converted feature map of the hidden layer of the first neural network from the at least one controllable conversion module;

generate a combined feature map of the at least one decoder module by combining the intermediate feature map of with the converted feature map of the hidden layer of the first neural network; and generate the output feature map of the at least one decoder module based on the combined feature map through at least one layer.

10. The electronic device of claim 9, wherein the at least one decoder module among the plurality of decoder modules is configured to:

generate the intermediate feature map by concatenating the upsampled input feature map of the at least one decoder module and a feature map of at least one encoder module.

11. The electronic device of claim 9, wherein the at least one decoder module among the plurality of decoder modules is further configured to:

convert a size of the converted feature map of the hidden layer of the first neural network to be equal to a size of the intermediate feature map; and generate the combined feature map based on an element-wise operation on the intermediate feature map and the size-converted feature map of the hidden layer of the first neural network.

12. The electronic device of claim 8, wherein the at least one controllable conversion module comprises a first controllable conversion module and a second controllable conversion module, wherein the first controllable conversion module is configured to receive and convert a feature map of a first hidden layer of the first neural network, wherein the second controllable conversion module is configured to receive and convert a feature map of a second hidden layer of the first neural network, wherein the sequence of the plurality of decoder modules comprises a first decoder module and a second decoder module, wherein the first decoder module is configured to receive the converted feature map of the first hidden layer of the first neural network from the first controllable conversion module, and wherein the second decoder module is configured to receive the converted feature map of the second hidden layer of the first neural network from the second controllable conversion module.

13. The electronic device of claim 12, wherein the first decoder module precedes the second decoder module in the sequence of the plurality of decoder modules, and wherein the second hidden layer precedes the first hidden layer.

14. The electronic device of claim 1, wherein output images having pictorial depth cues of different levels are output for control parameters having different values.

15. The electronic device of claim 1, wherein the second level of a pictorial depth cue of the output image periodically changes as a value of the control parameter is increased.

16. The electronic device of claim 1, wherein the at least one pictorial depth cue comprises a first pictorial depth cue and a second pictorial depth cue, wherein the control parameter is a single variable, and wherein a level of the first pictorial depth cue and a level of the second pictorial depth cue of the output image are changed as a value of the control parameter is changed.

17. The electronic device of claim 1, wherein, in a first feature vector output by the first neural network receiving a first input image, a second feature vector output by the first neural network receiving a second input image identical to the first input image, and a third feature vector output by the first neural network receiving a third input image which is obtained by adding a pictorial depth cue to the first input image, a magnitude of a difference between the first feature vector and the second feature vector is less than a magnitude of a difference between the first feature vector and the third feature vector.

18. The electronic device of claim 1, wherein the at least one pictorial depth cue comprises at least one of blur, contrast, and sharpness.

19. A method of generating an image with an enhanced depth as perceived by a viewer, the method comprising:

receiving an input image;

receiving a control parameter for adjusting a first level of at least one pictorial depth cue included in the input image;

generating an output image comprising the at least one pictorial depth cue of a second level that is adjusted from the first level based on the control parameter using a deep neural network, wherein the deep neural network comprises:

a first neural network configured to receive the input image and output a feature vector corresponding the input image;

a second neural network configured to receive the input image, and generate a feature map by reducing a spatial resolution of the input image;

a third neural network configured to receive the feature map output by the second neural network, and generate the output image by increasing a spatial resolution of the feature map output by the second neural network; and at least one controllable conversion module configured to:

receive a feature map of a hidden layer of the first neural network, and convert the feature map of the hidden layer of the first neural network based on the control parameter, wherein the second neural network is further configured to combine a feature map of a hidden layer of the second neural network with the feature vector output by the first neural network, and wherein the third neural network is further configured to combine a feature map of a hidden layer of the third neural network with the converted feature map of the hidden layer of the first neural network.

20. A non-transitory computer-readable storage medium storing instructions that, when executed by at least one processor, cause the at least one processor to:

receive an input image;

receive a control parameter for adjusting a first level of at least one pictorial depth cue included in the input image; and generate, using a deep neural network, an output image comprising the at least one pictorial depth cue at a second level that is adjusted from the first level based on the control parameter, wherein the deep neural network comprises:

a first neural network configured to output a feature vector corresponding to the input image and a feature map of a hidden layer of the first neural network;

a second neural network configured to generate a feature map by reducing a spatial resolution of the input image;

at least one controllable conversion module configured to:

receive the feature map of the hidden layer of the first neural network, and convert the feature map of the hidden layer of the first neural network based on the control parameter; and a third neural network configured to receive the converted feature map of the hidden layer of the first neural network and generate, based on the converted feature map of the hidden layer of the first neural network, the output image by increasing a spatial resolution of the feature map generated by the second neural network.

\* \* \* \* \*